United States Patent
Frieh et al.

(10) Patent No.: US 9,906,842 B2
(45) Date of Patent: Feb. 27, 2018

(54) SELECTIVELY DISABLING OR ENABLING MULTIPLE TRANSMIT CHANNEL MODE OPERATIONS FOR CABLE MODEMS CAPABLE THEREOF

(75) Inventors: Dwain E. Frieh, Oswego, IL (US); Ruth A. Cloonan, Lisle, IL (US); Dale Paney, Lombard, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 381 days.

(21) Appl. No.: 13/117,619

(22) Filed: May 27, 2011

(65) Prior Publication Data

US 2012/0300819 A1    Nov. 29, 2012

(51) Int. Cl.
| | |
|---|---|
| H04N 21/61 | (2011.01) |
| H04L 12/28 | (2006.01) |
| H04L 12/24 | (2006.01) |
| H04M 11/06 | (2006.01) |

(52) U.S. Cl.
CPC ..... *H04N 21/6118* (2013.01); *H04L 12/2807* (2013.01); *H04L 12/2898* (2013.01); *H04L 41/08* (2013.01); *H04M 11/06* (2013.01)

(58) Field of Classification Search
CPC ............ H04N 21/6118; H04L 12/2898; H04L 12/2807; H04L 41/08; H04M 11/06
USPC .................................................. 370/468, 352
See application file for complete search history.

(56) References Cited

U.S. PATENT DOCUMENTS

| | | | |
|---|---|---|---|
| 6,898,755 B1 * | 5/2005 | Hou | 714/784 |
| 7,523,329 B2 | 4/2009 | Ezra et al. | |
| 7,970,010 B2 | 6/2011 | Denney et al. | |
| 7,990,951 B2 * | 8/2011 | Walston et al. | 370/352 |
| 8,189,517 B2 * | 5/2012 | Benveniste | 370/329 |
| 8,279,892 B2 * | 10/2012 | Denney et al. | 370/468 |
| 2010/0154016 A1 | 6/2010 | Li et al. | |
| 2012/0095858 A1 * | 4/2012 | Dunstan et al. | 705/26.1 |

OTHER PUBLICATIONS

International Search Report and the Written Opinion of the International Searching Authority dated Aug. 15, 2011, for International Application No. PCT/US2011/034811 filed May 2, 2011.
Upstream Channel Bonding. Guide [online]. Cisco Corporation. First Published: Nov. 16, 2009; Last Updated: May 23. 2011. Retrieved from the internet: <URL: http://www.cisco.com/en/US/docs/ios/cable/configuration/guide/ubr_uscb.html>.

* cited by examiner

*Primary Examiner* — Walter Divito
*Assistant Examiner* — Anthony Luo
(74) *Attorney, Agent, or Firm* — Bart A. Perkins

(57) ABSTRACT

Methods and apparatuses for enabling or disabling MTC mode operations for a plurality of CPE devices in a MAC domain are provided. A system operator can control enabling MTC mode operations for certain CPE devices capable of MTC mode operations in a MAC domain by setting a control attribute in a CMTS enabled for MTC mode operations for the MAC domain.

5 Claims, 4 Drawing Sheets

SELECTIVELY DISABLING OR ENABLING MULTIPLE TRANSMIT CHANNEL MODE OPERATIONS FOR CABLE MODEMS CAPABLE THEREOF

TECHNICAL FIELD

This disclosure is related to multiple transmit channel mode operations for a cable modem.

BACKGROUND

A Data-Over-Cable Service Interface Specification (DOCSIS) system can be used to deliver high-definition digital entertainment and telecommunications such as video, voice, and high-speed Internet to subscribers over an existing cable television network. The cable television network can take the form of an all-coax, all-fiber, or hybrid fiber/coax (HFC) network. A cable service provider, such as a multiple service operator (MSO), can deliver these services to subscribers by using a cable modem termination system (CMTS) located at a headend and cable modems (CMs) and customer premise equipment (CPE) devices, such as set-top boxes, multimedia terminal adapters (MTAs), and gateway devices, located at subscriber premises. Traffic transferred from the CMTS to the CM can be said to travel in a downstream direction on one or more downstream channels; conversely, traffic transferred from the CM to the CMTS can be said to travel in an upstream direction on one or more upstream channels.

A DOCSIS MAC domain is a logical sub-component of a CMTS that is responsible for forwarding data to and from CMs reached by a set of downstream and upstream channels associated with the MAC domain.

Channel bonding for a MAC domain can be used to increase the rate of upstream and downstream traffic forwarding between a CMTS and a CM in the MAC domain. Channel bonding was introduced in the DOCSIS 3.0 specification. Since the bonding mechanisms for downstream and upstream channel bonding are different, downstream and upstream channel bonding for a MAC domain can be configured independently. Thus, for example, a DOCSIS system can enable downstream channel bonding for a MAC domain without enabling upstream channel bonding for the same MAC domain. Then, at a later time, the DOCSIS system can enable upstream channel bonding for the MAC domain. In another example, the DOCSIS system can enable upstream channel bonding for a MAC domain, without enabling downstream channel bonding. The DOCSIS system can later enable downstream channel bonding.

To perform upstream channel bonding for a particular CMTS MAC domain of a DOCSIS system, both the MAC domain and the CMs in the MAC domain must be enabled for upstream channel bonding. In particular, pursuant to DOCSIS 3.0, to perform upstream channel bonding for a particular CMTS MAC domain of a DOCSIS system, the CMTS MAC domain and CM in the MAC domain must be enabled to operate in a multiple transmit channel (MTC) mode MTC mode. However, in existing DOCSIS systems, once the MAC domain is enabled to operate in MTC mode, the CMTS always enables MTC mode operations for any CM in the MAC domain capable of MTC mode operations that registers with the CMTS MAC domain.

DETAILED DESCRIPTION

Various implementations of this disclosure permit a system operator to enable or disable MTC mode operations for one or more CMs in a MAC domain. In some implementations, the system operator can set a control attribute in a CMTS enabled for MTC mode operations for a MAC domain to conditionally disable MTC mode operations for one or more CMs in the MAC domain capable of operating in MTC mode. In some implementations, if a CM in the MAC domain meets a certain criteria, the CM is enabled for MTC mode operations. The various implementations described herein are described with reference to a cable modem, but it should be understood that the concepts disclosed herein can be applied to enabling or disabling MTC mode operations for one any CPE device. Furthermore, although this disclosure makes reference to a DOCSIS-based system, this disclosure is not intended to be limited to a DOCSIS-based system.

Figure 1:
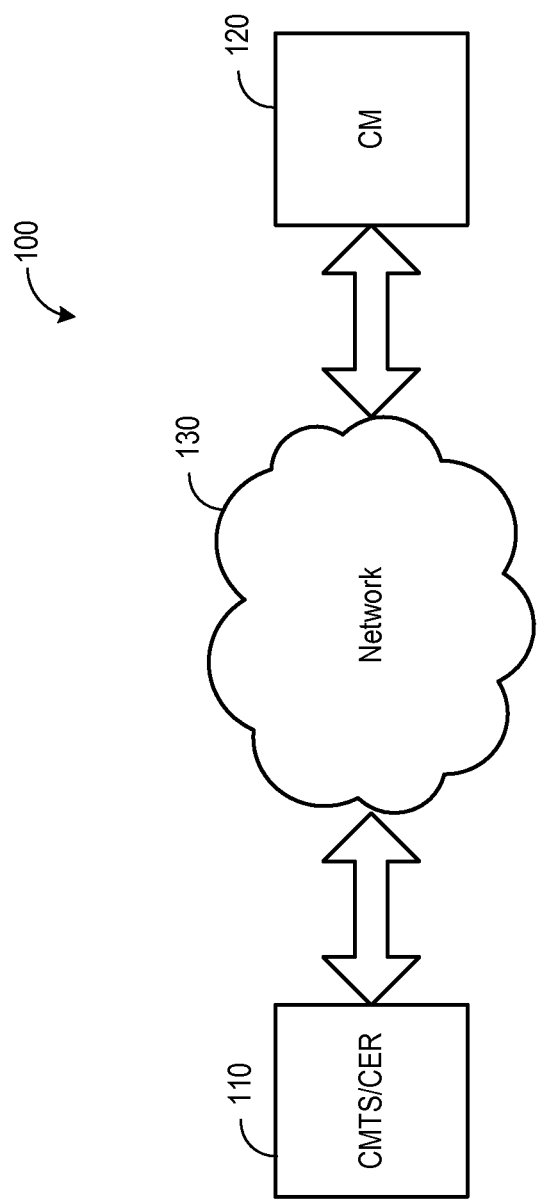
FIG. 1 is a block diagram illustrating an example DOCSIS-based system used to provide communications between a CMTS and a CM over a network.

FIG. 1 illustrates an example DOCSIS-based system operable to deliver high-definition digital entertainment and telecommunications such as video, voice, and high-speed Internet to a subscriber over an existing cable television network. As shown in FIG. 1, traffic (e.g., data, video, and voice signal) can be transmitted over a cable network 130 between a CMTS or converged edge router (CER) 110 and a cable modem (CM) 120. The cable network 130 can take the form of an all-coax, all-fiber, or hybrid fiber/coax (HFC) network.

Traffic transmitted from the CMTS/CER 110 to the CM 120 can be said to travel in a downstream direction on one or more downstream channels; conversely, traffic transmitted from the CM 120 to the CMTS/CER 110 can be said to travel in an upstream direction on one or more upstream channels.

As mentioned above, channel bonding can be used to increase the rate of upstream and/or downstream traffic forwarding between the CMTS and CM. For downstream channel bonding for a MAC domain, the CMTS 110 dynamically distributes downstream packets over a set of downstream channels for delivery to a CM 120 in the MAC Domain. The CM 120 has multiple receivers and is tuned to receive all of the channels in the set. Each packet transmitted by the CMTS 110 can be tagged with a sequence number so that proper data sequencing is not lost if there are differences in latency between the channels in the set. The CM 120 may re-sequence the downstream data stream to restore the original packet sequence.

Upstream channel bonding for a MAC domain can occur when the CMTS 110 and CM 120 are enabled to operate in multiple transmit channel (MTC) mode, e.g., as described in DOCSIS 3.0. Various pre-DOCSIS 3.0 CMTS and CM functionalities (such as request mechanisms, grant mechanisms, and grant-filling mechanisms) are different in the DOCSIS 3.0 MTC mode. For example, for upstream channel bonding, the CM 120 divides a stream of packets into a set of segments and transmits the segments over multiple upstream channels during time slots granted by the CMTS 110. The CM 120 can place an incrementing sequence number in the segments transmitted on the channels so that the CMTS 110 can reconstruct the original stream.

The registration process described in the DOCSIS specification can be used to enable a CM to operate in a MTC mode. When the CM establishes a connection to the CMTS, the CM can inform the CMTS of whether it is capable of operating in the MTC mode. For example, the CM can inform the CMTS of whether it is capable of operating in the MTC mode through a multiple transmit channel support modem capability encoding in the registration request message as described in the DOCSIS specification. If the CM reports a multiple transmit channel support capability of zero, for example, then the CM is incapable of operating in the MTC mode. If the CM reports a non-zero multiple transmit channel support capability, for example, then the CM is capable of operating in the MTC mode.

In existing systems, if the CMTS is enabled to operate in the MTC mode for a particular MAC domain and a CM in the same MAC domain is capable of operating in the MTC mode, then the CMTS automatically enables the CM to operate in the MTC Mode. The CMTS can enable the CM to operate in the MTC Mode by, for example, confirming (e.g., returning) in the registration response message the value of the multiple transmit channel support capability parameter transmitted in the registration request message.

If the CMTS is enabled to operate in the MTC mode for a particular MAC domain but a CM in the MAC domain is not capable of operating in the MTC mode, then the CMTS will not enable the CM to operate in the MTC mode. For example, the CMTS can return a value of zero (indicating that the capability must be turned off) for the multiple transmit channel support capability parameter in the registration response message. If the CMTS is disabled from operating in the MTC mode for a particular MAC domain, the CMTS will not enable a CM in the MAC domain to operate in the MTC mode regardless of whether the CM is capable of operating in the MTC mode. Thus, the CMTS can return a value of zero for the multiple transmit channel support capability parameter in the registration response message.

Thus, in existing DOCSIS systems, once the CMTS is enabled to operate in the MTC mode for a particular MAC domain, the CMTS automatically enables MTC mode operations for any CM in the MAC domain capable of operating in MTC mode that registers with the CMTS MAC domain. These existing DOCSIS systems do not permit a system operator to control whether to enable MTC mode operations for a CM capable of operating in MTC mode. That is, even if a particular CMTS MAC domain is capable of operating in MTC mode, a system operator may want to delay MTC mode operations for certain CMs capable of MTC mode operations in the MAC domain. For example, during an upgrade of a MAC domain to upstream channel bonding, it may be desirable to delay enabling all the CMs in the MAC domain for MTC mode operations until successful field trials have been made with a subset of the CMs. As another example, for a particular MAC domain enabled for MTC mode operations, it may be desirable to delay enabling a CM in the MAC domain for MTC mode operations until the end user of the CM has paid for the service. As another example, it may be desirable to delay enabling all the CMs in the MAC domain for MTC mode operations for traffic engineering purposes. For example, it may be desirable to delay enabling a CM in the MAC domain for MTC mode operations based on traffic data (e.g., channel load, channel utilization, percentage of total bandwidth being used, MAC domain load, congestion, packet loss due to congestion, or any other traffic data. Thus, for a particular MAC domain enabled for MTC mode operations, it may be desirable to select which CMs in the MAC domain will be enabled for MTC mode operations.

This disclosure is not limited to any particular traffic data metric. Any existing or future developed traffic data metric is intended to be included within the scope of this disclosure.

Figure 2:
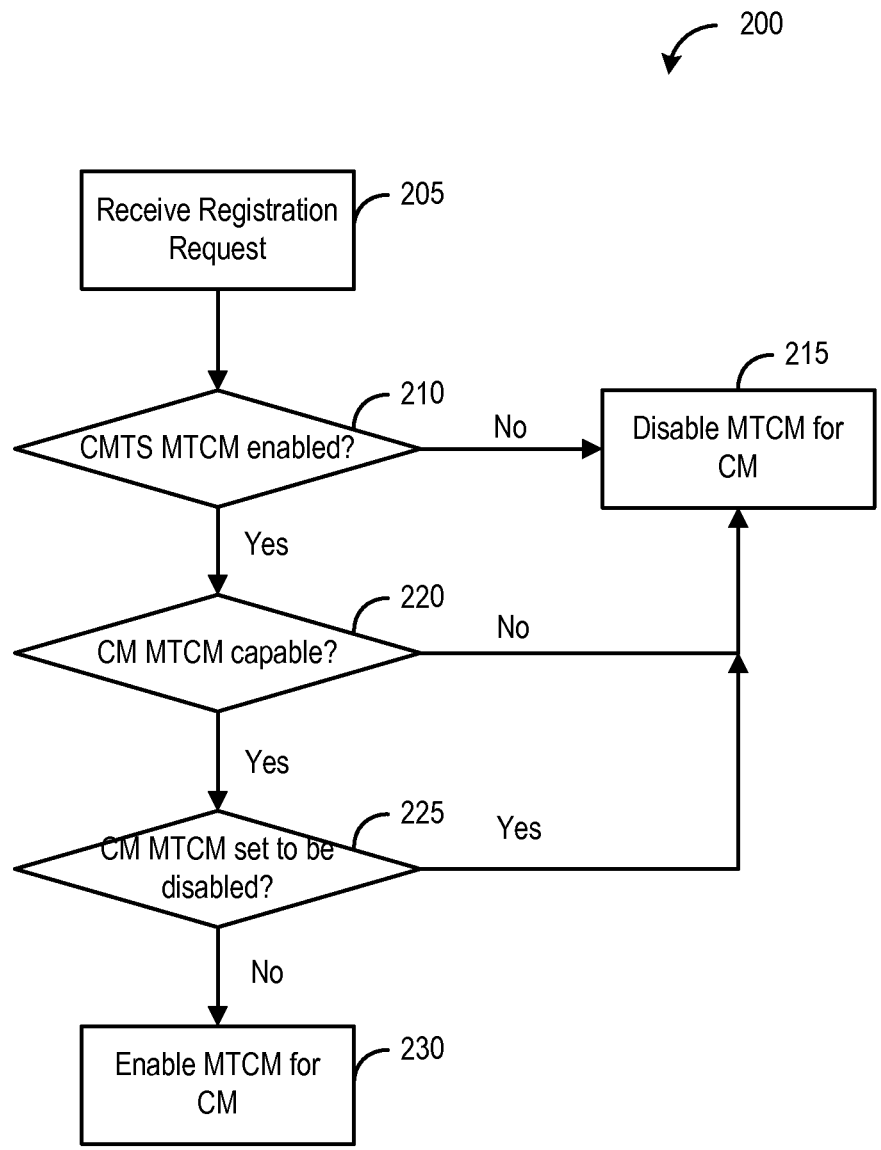
FIGS. 2 and 3 are flowcharts illustrating example processes for determining whether to enable or disable MTC mode operations for a CM.
Figure 3:
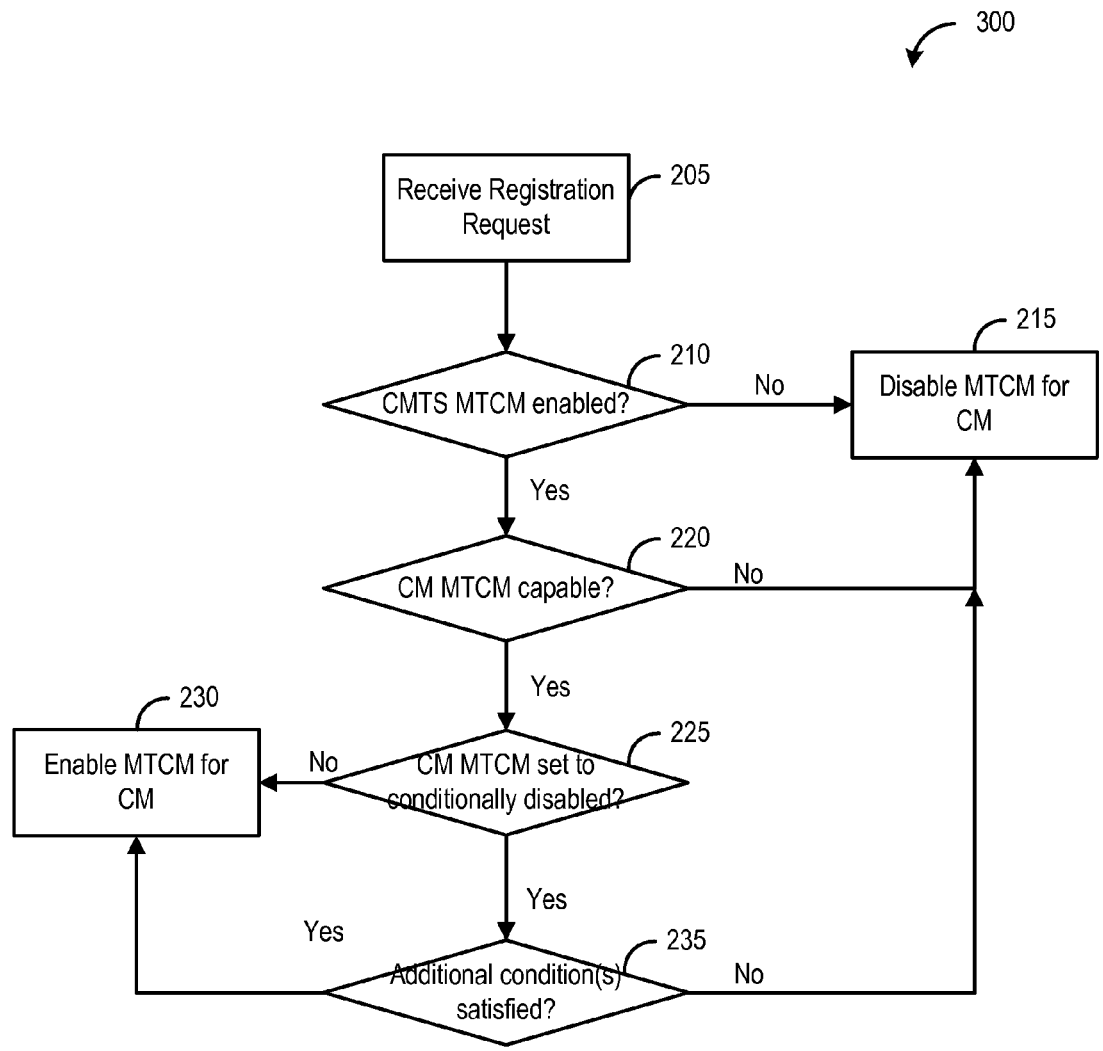

FIGS. 2 and 3 illustrate example processes 200, 300, respectively for determining whether to enable MTC mode operations for a CM. It can be assumed in these examples that, based on the DOCSIS specification, the CMTS receives a registration request message from a CM containing a multiple transmit channel support capability parameter indicating whether the CM is capable of operating in the MTC mode. It also can be assumed in these examples that a system operator can set a control attribute to conditionally enable or disable MTC mode operations for a CM capable of MTC mode operations. For example, a control attribute that permits a system operator to conditionally disable MTC mode operations for a CM capable of MTC mode operations can be included as a new object used by a new vendor-implemented management information base (MIB) module. In some implementations, the control attribute can be set to one of two values to specify whether MTC mode operations for a CM capable of MTC mode operations are conditionally disabled. For example, a first value of the control attribute can indicate that MTC mode operations for a CM capable of MTC mode operations in a MAC domain is conditionally disabled, even if the CMTS MAC domain to which it registers is enabled for MTC mode operations; a second value of the control attribute can indicate that MTC mode operations for a CM capable of MTC mode operations in a MAC domain is enabled if the CMTS MAC domain to which it registers is enabled for MTC mode operations.

At stage 205, a CMTS (e.g., CMTS 110 of FIG. 1) receives a registration request from a CPE device (e.g., CM 120 of FIG. 1) in a particular MAC domain.

At stage 210, it is determined whether the CMTS MAC domain is enabled to operate in the MTC mode. If the CMTS MAC domain is not enabled for MTC mode operations ("No" at stage 210), then at stage 215, the CMTS disables the CM from operating in the MTC mode. In some implementations, the CMTS can disable the CM from operating in the MTC mode by setting the multiple transmit channel support capability parameter in the registration response message to a first value (e.g., zero) to indicate that the capability has been turned off. In some implementations, the registration response message can be based on the DOCSIS specification. However, it should be understood that in some implementations, the registration response can be any message from the CMTS to the CM disabling the CM from operating in the MTC mode.

If the CMTS MAC domain is enabled to operate in the MTC mode ("Yes" at stage 210), then at stage 220, it is determined whether the CM is capable of operating in the MTC mode. In some implementation, this determination can be made based on the multiple transmit channel support capability parameter in the registration request received at stage 205. In some implementations, the registration request can be based on the DOCSIS specification. However, it should be understood that in some implementations, the registration request can be any message from the CM to the CMTS informing the CMTS of the CM's MTC mode capability.

If the CM is not capable of MTC mode operations ("No" at stage 220), then the CMTS can disable the CM from MTC mode operations at stage 215, as discussed above.

If the CM is capable of MTC mode operations ("Yes" at stage 220), then at stage 225, it is determined whether MTC mode operations for CMs capable of MTC mode operations in the MAC domain have been set to be disabled. In some implementations, this determination can be made based on the value of a control attribute that can be set by a system operator. If CM MTC mode operations have not been set to be disabled ("No" at stage 225), then the CMTS enables the CM for MTC mode operations at stage 230. In some implementations, the CMTS can enable the CM to operate in the MTC mode by setting the multiple transmit channel support capability parameter in the registration response message to a second value (e.g., one) to indicate that the capability has been turned on. In some implementations, the registration response message can be based on the DOCSIS specification. However, it should be understood that in some implementations, the registration response can be any message from the CMTS to the CM enabling the CM to operate in the MTC mode.

If CM MTC mode operations have been set to be disabled ("Yes" at stage 225), then the CMTS can disable the CM from MTC mode operations at stage 215, as discussed above.

In some implementations, as shown in FIG. 3, prior to disabling the CM from MTC mode operations, it can be determined (e.g., by the CMTS 110 of FIG. 1) at stage 235 whether one or more conditions met. For example, it can be determined at stage 235 whether the CM is authorized for MTC mode operations based on payment by the end user. The CMTS can query a database such as a billing database to determine whether the end user has paid for MTC mode operations. As another example, it can be determined at stage 235 whether one or more conditions based on traffic data is met. For example, it can be determined whether the number of cable modems registered on a channel is below a predetermined number. As another example, it can be determined whether a channel utilization is below a predetermined number. As yet another example, it can be determined whether there is no traffic congestion. This disclosure is not limited to any particular traffic condition(s).

If the one or more conditions are met ("Yes" at stage 235), then the CMTS enables the CM for MTC mode operations at stage 230, as discussed above. If one or more of the one or more conditions are not met ("No" at stage 235), then the CMTS disables the CM from MTC mode operations at stage 215, as discussed above.

In alternate implementations, stage 235 can include different or additional conditions that must be met prior to disabling the CM from MTC mode operations. For example, it can be determined at stage 235 whether the CM has at least one bonded service flow (e.g., a service flow assigned to two of more upstream channels for upstream channel bonding). In some implementations, this determination can be made based on service flow information in the CM's configuration file, which may be transmitted to the CMTS in the registration request. If the CM has a bonded service flow ("Yes" at stage 235), then the CMTS enables the CM for MTC mode operations at stage 230, as discussed above. If the CM does not have a bonded service flow ("No" at stage 235), then the CMTS disables the CM from MTC mode operations at stage 215, as discussed above. As another example, it can be determined at stage 235 whether the CM is included on a list (e.g., by MAC address) of CMs to enable for MTC mode operations. If the CM is included on a list of CMs to enable for MTC mode operations, then the CMTS enables the CM for MTC mode operations at stage 230, as discussed above. If the CM is not included on a list of CMs to enable for MTC mode operations ("No" at stage 235), then the CMTS disables the CM from MTC mode operations at stage 215, as discussed above.

By setting a control attribute to enable or disable MTC mode operations for a CM capable of MTC mode operations that registers with a CMTS MAC domain enabled for MTC mode operations, a system operator can delay enabling MTC mode operations for select CMs capable of MTC mode operations in the MAC domain based on certain criteria (such as each CMs' service flow, status on a list, or any other criteria).

The control attribute can take many forms and this disclosure is not limited to the examples set forth above.

Figure 4:
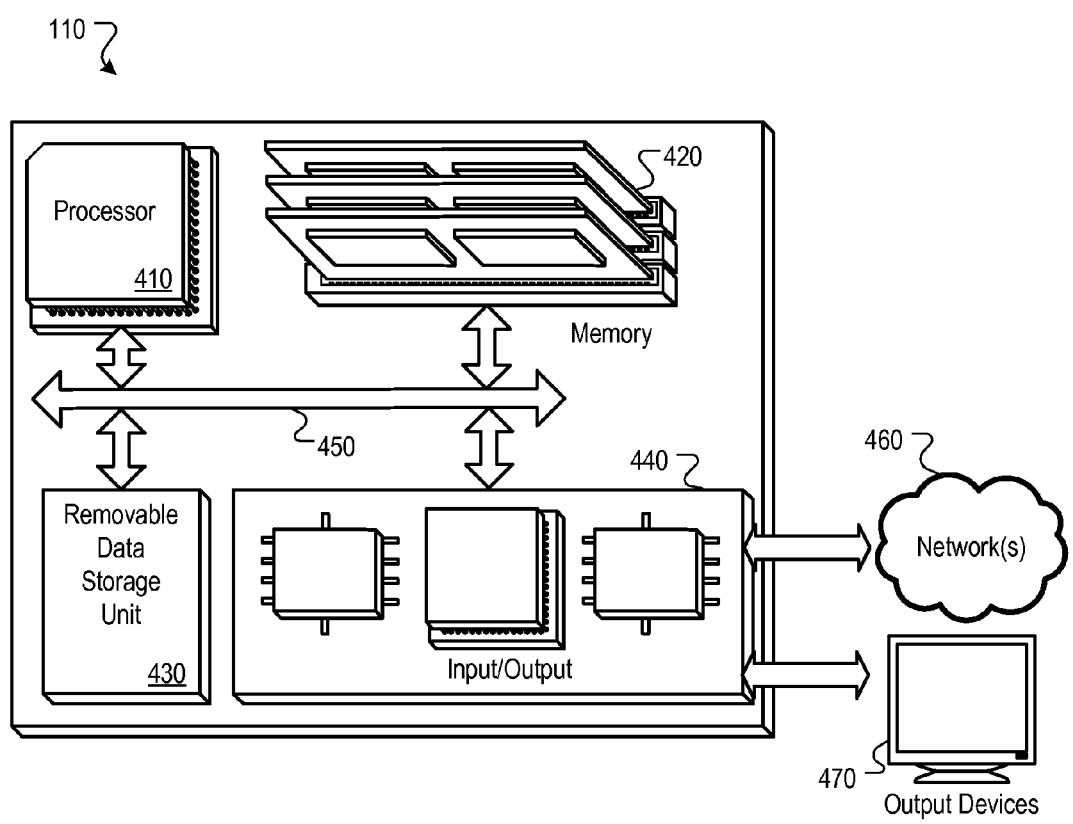
FIG. 4 is a block diagram illustrating a CMTS operable to enable or disable MTC mode operations for a CM.

FIG. 4 illustrates an example CMTS 110 operable to perform the example process 200 of FIG. 2. The CMTS 110 can include a processor 410, a memory 420, a removable data storage unit 430, and an input/output device 440. Each of the components 410, 420, 430, and 440 can, for example, be interconnected using a system bus 450. In some implementations, the download manager 490 can include one of more interconnected boards where each board comprises components 410, 420, 430, and 440. The processor 410 is capable of processing instructions for execution within the download manager 490. For example, the processor 410 can be capable of processing instructions for executing the process 200 of FIG. 2 in the CMTS 110. In some implementations, the processor 410 is a single-threaded processor. In other implementations, the processor 410 is a multi-threaded processor. The processor 410 is capable of processing instructions stored in the memory 420 or on the storage device 430.

The memory 420 stores information within the CMTS 110. In some implementations, the memory 420 is a computer-readable medium. In other implementations, the memory 420 is a volatile memory unit. In still other implementations, the memory 420 is a non-volatile memory unit.

In some implementations, the storage device 430 is capable of providing mass storage for CMTS 110. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the CMTS 110. In one implementation, the input/output device 440 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device 440 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A computer-implemented method of determining whether to enable multiple transmit channel (MTC) mode operations for a customer premise equipment (CPE) device in a media access control (MAC) domain, the method comprising:
   performing a first determination of whether a cable modem termination system (CMTS) MAC domain is enabled for MTC mode operations;
   performing a second determination of whether a CPE device in the CMTS MAC domain is capable of MTC mode operations;
   performing a third determination of whether the CPE device has been configured to be conditionally disabled for MTC mode operations;
   performing a fourth determination of whether the CPE device meets a first condition wherein the first condition comprises a condition that has been established for authorizing MTC mode operations at the CPE device when MTC mode operations have been conditionally disabled at the CPE device; and
   performing a fifth determination of whether to enable the CPE device for MTC mode operations based on the first, second, third, and fourth determinations, wherein performing the fifth determination of whether to enable the CPE device for MTC mode operations comprises:
      determining to enable the CPE device for MTC mode operations if the first determination is made that the CMTS MAC domain is enabled for MTC mode operations, the second determination is made that the CPE device is capable of MTC mode operations, the third determination is made that MTC mode operations for the CPE device are set to be disabled, and the fourth determination is made that the CPE device meets the first criteria; and
      determining to disable the CPE device from MTC mode operations if the first determination is made that the CMTS MAC domain is enabled for MTC mode operations, the second determination is made that the CPE device is capable of MTC mode operations, the third determination is made that MTC mode operations for the CPE device are set to be disabled, and the fourth determination is made that the CPE device does not meet the first criteria.

2. The computer-implemented method of claim 1, further comprising receiving a registration request from the CPE device, wherein the second determination is based on the registration request.

3. A computer-implemented method of determining whether to enable multiple transmit channel (MTC) mode operations for a customer premise equipment (CPE) device in a media access control (MAC) domain, the method comprising:
   performing a first determination of whether a cable modem termination system (CMTS) MAC domain is enabled for MTC mode operations;
   performing a second determination of whether a CPE device in the CMTS MAC domain is capable of MTC mode operations;
   performing a third determination of whether the CPE device has been configured to be disabled for MTC mode operations;
   performing a fourth determination of whether a first criteria is met based on traffic data; and
   performing a fifth determination of whether to enable the CPE device for MTC mode operations based on the first, second, third, and fourth determinations, wherein performing the fifth determination of whether to enable the CPE device for MTC mode operations comprises:

determining to enable the CPE device for MTC mode operations if the first determination is made that the CMTS MAC domain is enabled for MTC mode operations, the second determination is made that the CPE device is capable of MTC mode operations, the third determination is made that MTC mode operations for the CPE device are set to be disabled, and the fourth determination is made that the CPE device meets the first criteria; and determining to disable the CPE device from MTC mode operations if the first determination is made that the CMTS MAC domain is enabled for MTC mode operations, the second determination is made that the CPE device is capable of MTC mode operations, the third determination is made that MTC mode operations for the CPE device are set to be disabled, and the fourth determination is made that the CPE device does not meet the first criteria.

4. The computer-implemented method of claim 3, wherein the traffic data is channel load.

5. The computer-implemented method of claim 3, further comprising receiving a registration request from the CPE device wherein the second determination is based on the registration request.

* * * * *